United States Patent [19]

Takuma et al.

[11] Patent Number: 4,818,047
[45] Date of Patent: Apr. 4, 1989

[54] POLARIZED WAVE PRESERVING FIBER

[75] Inventors: Yuuetsu Takuma; Hiroshi Kajioka; Tatsuya Kumagai, all of Hitachi; Toshihide Tokunaga, Kita-Ibaragi; Kohdo Yamada, Hitachi, all of Japan

[73] Assignee: Hitachi Cable Limited, Tokyo, Japan

[21] Appl. No.: 91,632

[22] Filed: Sep. 1, 1987

[30] Foreign Application Priority Data

Sep. 1, 1986 [JP] Japan ................... 61-203751

[51] Int. Cl.$^4$ .............................. G02B 6/22
[52] U.S. Cl. .................. 350/96.33; 350/96.34
[58] Field of Search .......... 350/96.29, 96.30, 96.33, 350/96.34

[56] References Cited

U.S. PATENT DOCUMENTS

| 4,354,736 | 10/1982 | Maklad et al. | 350/96.30 |
| 4,426,129 | 1/1984 | Matsumura et al. | 350/96.34 |
| 4,493,530 | 1/1985 | Kajioke et al. | 350/96.34 |
| 4,500,168 | 2/1985 | Kajioka et al. | 350/96.34 |

Primary Examiner—William L. Sikes
Assistant Examiner—Robert E. Wise
Attorney, Agent, or Firm—Cullen, Sloman, Cantor, Grauer, Scott & Rutherford

[57] ABSTRACT

A polarized wave preserving fiber has a core at its center, cladding, an oval jacket, and a support member in order to improve transmitting property of the polarized single mode by adjusting the refractive index distribution and the ellipticity of the oval jacket.

7 Claims, 5 Drawing Sheets

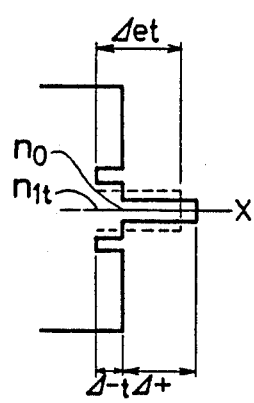
FIG.5(c)
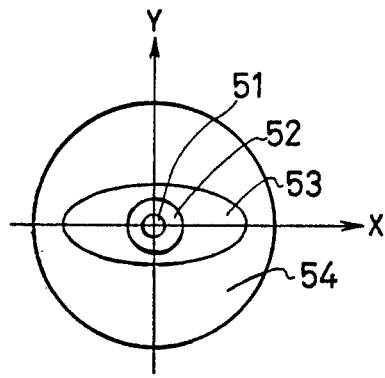
FIG.5(a)
FIG.5(b)
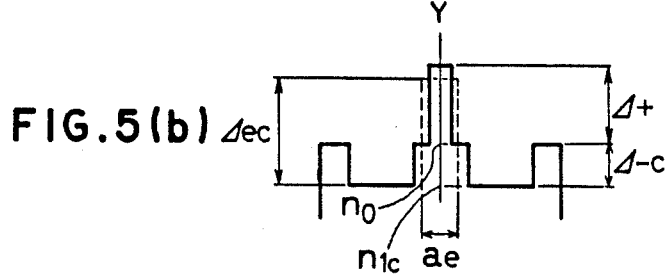
FIG.6
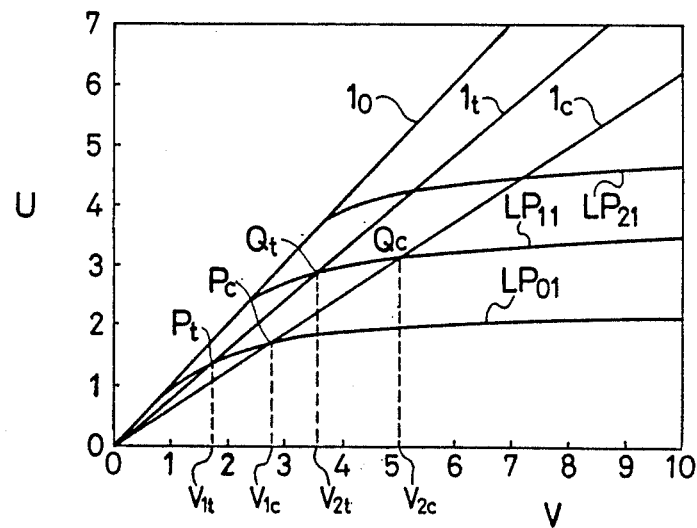

POLARIZED WAVE PRESERVING FIBER

TECHNICAL FIELD

This invention relates to a polarized wave preserving fiber, and more particularly a polarized wave preserving fiber which can be utilized as a transmission line for coherent communication.

BACKGROUND OF INVENTION

An elliptical jacket fiber and a panda fiber, shown in FIGS. 1 and 2 respectively of the accompanying drawings, are known for use as polarizing wave preserving fibers. An ellipical jacket 12 surrounding cladding 11 of the elliptical jacket fiber and stressing members 23 contained within support member 22 and on opposite sides of the cladding 21 of the panda fiber are respectively made from materials which have a high thermal expansion coefficient such as silicon dioxide ($SiO_2$) glass to which boron (B) or phosphorous (P) are added, consequently aeolotropic stresses bear on cores 13 and 24 possess the property of double refraction, and optical coupling between two perpendicularly-crossed polarized modes is restrained so that only one polarization mode can be transmitted.

In manufacturing the optical fiber, it is generally difficult to avoid fluctuations in the refractive index and the diameter in the longitudinal direction so that optical coupling between two perpendicularlycrossed polarized modes and a high extinction ratio cannot be obtained. Accordingly, the use of such an optical fiber with a sophisticated optical measuring system can result in deterioration of the system.

On the other hand, if the double refractive index of the fiber is raised in order to prevent optical coupling between the perpendicularly-crossed polarized modes from being generated, the dispersions of each polarization are increased, and once the optical coupling occurs, considerable expansion in the pulse width occurs, which is unsuitable for a long-distance communication transmission system.

SUMMARY OF THE INVENTION

The present invention was developed in order to overcome the abovementioned problems. The objective of the present invention is to provide a polarized wave preserving fiber which has an excellent extinction ratio and which is capable of transmitting only a single polarized mode.

The polarized wave preserving fiber according to one aspect of the invention comprises a core, cladding formed around the core, an elliptical jacket provided around the cladding having an ellipticity of 25 to 40% and a specific refractive index difference of −0.05 to 0.3%, and a support member around the elliptical jacket and having the same refractive index as the cladding. The width and the depth of the recess formed in the refractive index contribution curve of each are chosen so as to let the mode polarized on the short or minor axis side undergo a large bending loss due to disturbances such as bending and torsion and to prevent the mode polarized in the long or major axis side from being affected by the disturbances, and thereby a virtually absolute single polarization is achieved.

The polarized wave preserving fiber according to a second aspect of the invention comprises a core, cladding formed around the core, an oval jacket provided around the cladding whose refractive index varies in the circumferential direction in a manner such that the refractive index of the jacket in the minor axis direction is lower than that of the cladding and much lower than that in the major axis direction, and a support member provided around the oval jacket and having the same refractive index as the cladding. This fiber has a shallow W-shaped refractive index distribution curve pattern in the minor axis direction and a deep W-shaped pattern in the major axis direction.

Because of the above described structure, the single guided mode regions of the polarized mode in the major axis direction and that in the minor axis direction diverge or cover different regions. Thus, if the wavelength of the light to be transmitted is in the single guided mode in either the major or minor axis direction and in a leakage mode region in the other axis direction, the transmission of the single polarized wave is carried out.

According to a third aspect of the invention, a polarized wave preserving fiber comprises a core, cladding formed around the core, an oval jacket around the cladding, the refractive index varying along the periphery in a manner such that its refractive index in the major axis direction is lower than that of the cladding and higher than that of the cladding in the minor axis direction, and a support around the oval jacket and having the same refractive index as the cladding. Also, there is a substantial difference in the cutoff wavelength between the polarized wave modes in the major and minor axis directions.

Thus, an optical fiber which is capable of transmitting only a single polarized wave (called "polarized mode only transmitting fiber" hereinafter) can easily be constructed by applying bending or micro-bending to the polarized wave preserving fiber.

BRIEF DESCRIPTION OF THE DRAWINGS

FIGS. 5-$a$, $b$, and $c$ are sectional views of the polarized wave only transmitting fiber of the second embodiment of the invention and the distribution curves of the refractive index in the X and Y axes, respectively.

FIG. 6 illustrates characteristic curves depicting the U-V relationship in the X and Y axis directions of the second embodiment.

DESCRIPTION OF THE PREFERRED EMBODIMENT

Preferred embodiments of the invention will now be described with reference to the accompanying drawings.

Figure 1:
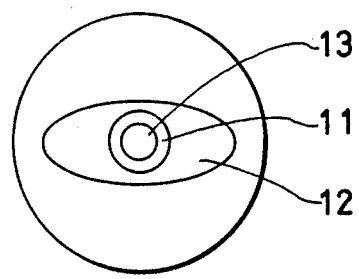
FIGS. 1 and 2 depict sectional views of conventional optical fibers, respectively.
Figure 2:
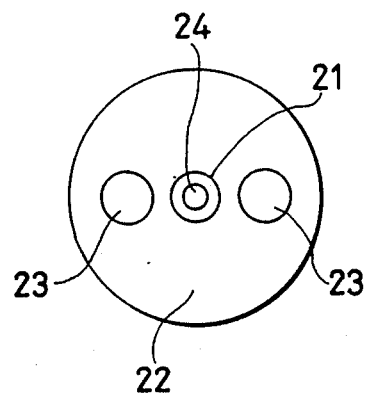
Figure 3C:
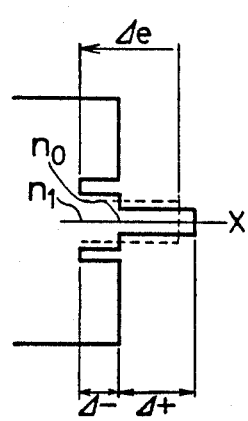
FIGS. 3-$a$, $b$, and $c$ are sectional views of the polarized mode only transmitting fiber, and contribution curves or patterns along X and Y axes of a first embodiment of the present invention, respectively.
Figure 3A:
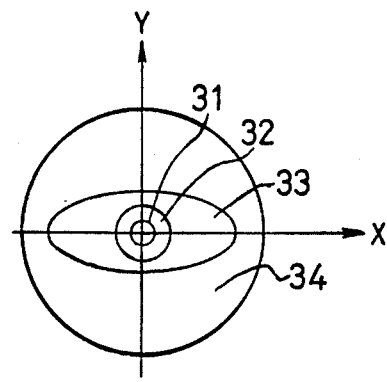
Figure 3B:
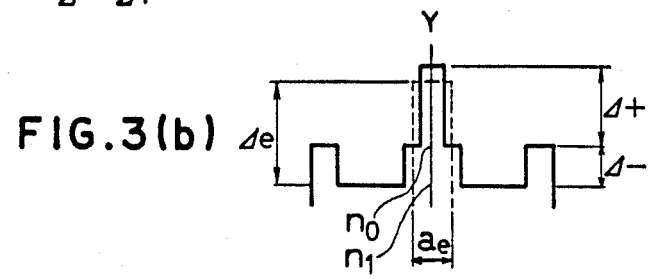

In FIG. 3, the numeral 31 designates a core made from germanium (Ge) add $SiO_2$ glass. Surrounding the core 31 there is formed cladding 32 made from pure $SiO_2$ glass. Cladding 32 is surrounded by an oval jacket 33. The oval jacket 33 is made from $B_2O_3$ modified SiO glass, and has a refractive index $n_1$ lower than the $n_0$ of the cladding 32.

A support member 34 having the same refractive index $n_0$ as the cladding 32, and which is made from pure $SiO_2$, surrounds the oval jacekt 33.

With respect to the function of the optical fiber of the first embodiment described above, since the depths of the recesses, created by the jacket and the cladding, of the distribution curves in the minor and major axis directions are equal to each other, the single mode areas in the two directions have the same shape.

Figure 4:
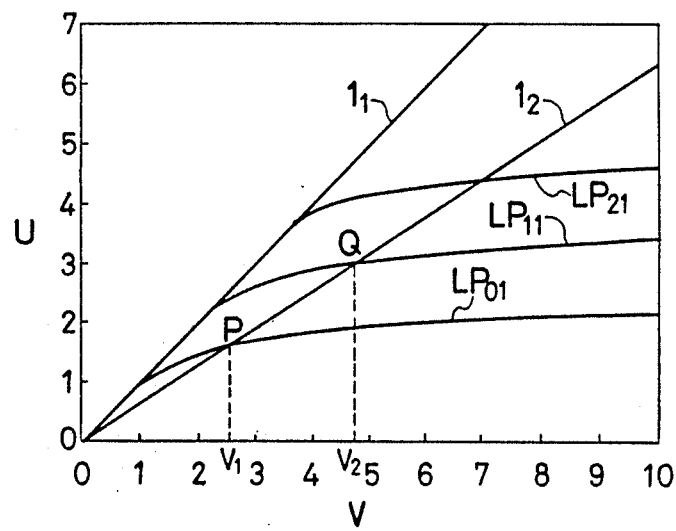
FIG. 4 shows characteristic curves depicting U-V characteristics in the X axis direction of the first embodiment of the invention.

FIG. 4 depicts the U-V characteristic curves of a fiber whose refractive index distribution pattern is W-shaped when the stair-like pattern created by the core 31 and the cladding 32 is replaced by the equivalent one or Equivalent Step Index (ESI), where "U" is a normalized phase constant in the transverse direction of the equivalent core, which can be obtained by solving the characteristic equation, and "V" is a normalized frequency which is determined by the equivalent core and the jacket 33.

The core diameter $a_e$ and the specific refractive difference ($\Delta_e$) in ESI are given by the following equations 1 and 2 where the stair-like distribution pattern of the refractive index of the core 31 and the cladding 32 is represented by F(r), $$a_e = 2\int_*^{**} F(r)\, r\, dr / \int_*^{**} F(r)\, dr \qquad (1)$$

$$\Delta e = (\Delta_+ + \Delta_-) \int_*^{**} F(r)\, dr / a_e \qquad (2)$$

where $\Delta_+$ and $\Delta_-$ are the specific refractive index differences between the core 31 and the cladding 32, and the same between the cladding 32 and the oval jacket 33, respectively.

Also in FIG. 4, $l_1$ is a line which indicates the relationship between U and V, when U=V, and $l_2$ when $U = V[(\Delta_e - \Delta_-)/\Delta_e]^{\frac{1}{2}}$. A line segment or a region on the V axis between $V_1$ and $V_2$ which respectively correspond to intersections P and Q of line $l_2$ and lines $LP_{01}$ and $LP_{11}$ is a single mode area, line $LP_{01}$ is the characteristic curve of the $LP_{01}$ mode and line $LP_{11}$ being of $LP_{11}$ mode. A region where the normalized frequency V is referred to as equal or less than $V_1$ is the leaky mode area where the optical loss is high, and a region where V is equal to or more than $V_2$ is referred to as multimode area.

Therefore, it is possible to effectively confine the electromagnetic field or the light to be transmitted by the fiber and to reduce the optical loss since the electromagnetic field is not absorbed by material such as boron.

Moreover, a polarized wave-preserving fiber can be obtained which transmits only the mode polarized in the major axis direction by assigning 25–40% ellipticity to the oval jacket 33, and −0.05 to −0.3% to the specific refractive index difference against the cladding 32 which is made from pure $SiO_2$ glass in order to increase the bending loss of the polarized mode in the minor axis direction while decreasing the bending loss of the mode polarized in the major axis direction.

A relatively short optical fiber was manufactured in accordance with the above description and its transmitting property was examined after it was bent; an extinction ratio of more than −50 (dB) was obtained, which means that the optical fiber can be employed as an excellent polarizer.

Since the amount of bending loss varies with the contribution curve of the refractive index, the ellipticity of the oval jacket and the specific refractive index difference between the oval jacket and the cladding, these parameters for the core and the cladding must be selected in relation to conditions such as the structure or the length of the cable.

FIG. 5 illustrates the second preferred embodiment of the polarized wave preserving fiber of this invention. The numeral 51 represents a core made from Ge modified $SiO_2$ glass. The cladding 52 of pure $SiO_2$ glass is formed so as to surround the core 51. Around the cladding 52 there is provided an oval jacket 53. The oval jacket 53 is made from $SiO_2$ glass containing $P_2O_5$ (phosphorous pentoxide) as well as $B_2O_3$. The jacket 53 has a high thermal expansion coefficient, a refractive index $n_1$ lower than the index $n_0$ of the cladding 52 in the minor axis (Y axis) direction because of the substantial amount of included $B_2O_3$ as shown in FIG. 5-c, and also because the refractive index $n_{1c}$ is lower than $n_{1t}$ in the major axis direction (X axis) as seen in FIG. 5-b because substantially much more $B_2O_3$ is added. Additionally, the support member 54 which surrounds the oval jacket 53, is made from pure $SiO_2$ glass and has the same refractive index $n_0$ as the cladding 52.

As explained above, the distribution curves of the refractive index of the fiber in X and Y axis directions according to the second embodiment are W-shaped, respectively. However, the depths of "W" are not equal to each other, the depth in Y axis being deeper than in X axis.

FIG. 6 shows U-V relationships of the fiber whose distributions are W-shaped in X and Y axis directions with, for the first embodiment, each "W" created by ESI, and the oval jacket 53 and the support member 54, the stair-like refractive index curve of the core 51 and the cladding 52 being replaced by ESI.

The diameter $a_e$ of the core of ESI, the specific refractive index difference $\Delta_{ee}$ in the X axis direction, and the same $\Delta_{et}$ in the Y axis direction are given by the following equations (3), (4), and (5) where the stairlike distribution curve of the refractive index of the core 51 and the cladding 52 is represented by F(r):

$$a_e = 2\int_*^{**} F(r)\, r\, dr / \int_*^{**} F(r)\, dr \qquad (3)$$

$$\Delta_{ec} = (\Delta_+ + \Delta_{-c}) \int_*^{**} F(r)\, dr / a_e \qquad (4)$$

$$\Delta_{et} = (\Delta_+ + \Delta_{-t}) \int_*^{**} F(r)\, dr / a_e \qquad (5)$$

where $\Delta_+$ is the difference between the specific refractive indexes of the core 51 and that of the cladding 52, and $\Delta$-c and $\Delta$-t are those between the cladding 52 and the oval jacket 53 in X and Y axis directions, respectively.

The plot designated by $l_0$ indicates the relationship between U and V when U=V, $l_c$ is the relationship when $U = V[(\Delta_{ec} - \Delta_{-c}/\Delta_{ec}]^{\frac{1}{2}}$ in the X axis direction, and $l_t$ is the relationship when $U = V[(\Delta_{et} - \Delta_{-t})/_{et}]^{\frac{1}{2}}$ in the Y axis direction. In other words, a region between points $V_{1c}$ and $V_{2c}$ which are the values on the V axis of intersections Pc and Qc of line $1_c$ and curves $LP_{01}$ and $LP_{11}$ is a single mode region in the X axis direction, where the curves $LP_{01}$ and $LP_{11}$ are characteristic curves of the $LP_{01}$ mode and the $LP_{11}$ mode, respectively. In a similar manner, a region between points $V_{1t}$ and $V_{2t}$ on V axis which correspond to intersections Pt and Qt of line 1t and curves $LP_{01}$ and $LP_{11}$ is the single mode region, where the curves $LP_{01}$ and $Lp_{11}$ are the characteristic curves of $LP_{01}$ mode and $LP_{11}$ mode, respectively. The region where the normalized frequency V is equal to or smaller than $V_{1c}$ or $V_{1t}$ is the leaky mode where the optical loss is high, and the region where V is equal to or more than $V_{2c}$ or $V_{2t}$ is the multimode.

Since the refractive index in the X axis direction of the oval jacket 53 is set to a value lower than that in the Y axis directiion, or Δ-c is larger than Δ-t, the line $1_c$ in FIG. 6 always has a smaller inclination compared with the line 1t. Hence, the relationships of $V_{1t} < V_{1c}$ and of $V_{2t} < V_{2c}$ are established. If the operating point, Vs, is set to a value between $V_{1t}$ and $V_{1c}$, ($V_{1t} < V < V_{1c}$), the mode polarized in the X axis direction is in the leaky mode so that the optical loss is high while the mode polarized in Y axis undergoes only a small loss. This means that the polarized wave preserving fiber which is capable of transmitting only the polarized wave mode in the Y axis direction is realized.

The damping coefficients of the leaky mode polarized in the X axis direction and of the higher order mode in Y axis direction can be optionally determined by the refractive index of the equivalent core, the refractive index, and the lengths of the major and minor axes of the oval jacket 53.

Figure 7C:
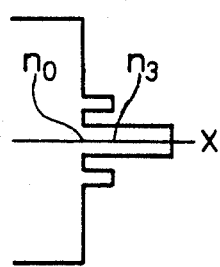
FIGS. 7-$a$, $b$. and $c$ are sectional views of the third embodiment and distribution curves of the refractive index in the X and Y axis directions, respectively.
Figure 7A:
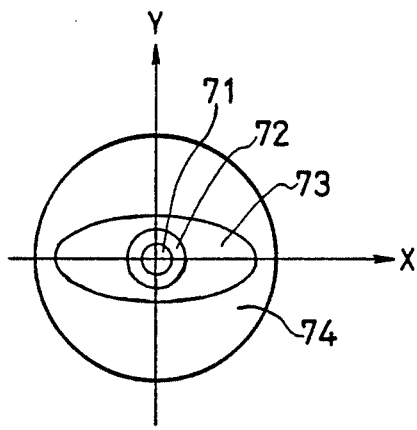
Figure 7B:
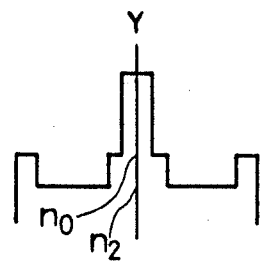

FIG. 7 depicts the polarized wave preserving fiber of a third embodiment according to the present invention. The numeral 71 designates a core made from Ge modified $SiO_2$ glass. Around the core 71 there is formed cladding 72 made from pure $SiO_2$ glass. An oval jacket 73 is provided around the cladding 72. The oval jacket 73 is made from $SiO_2$ glass to which $P_2O_5$ and $B_2O_3$ are added and has a high thermal expansion coefficient. The jacket 73 contains a large amount of $B_2O^3$ in the longitudinal direction (X axis direction) so that, as seen in FIG. 7-b it has a refractive index $n_2$ lower than that $n_0$ of the cladding 72, and contains a considerable amount of $P_2O_5$ in the short axis direction (Y axis direction), as seen in FIG. 7-c and has a higher refractive index $n_3$ compared with that $n_0$ of the cladding 72. The support member 72 made from pure $SiO_2$ glass is provided around the oval jacket 73.

The polarized wave preserving fiber described immediately above is produced by a method which will now be described.

Figure 8:
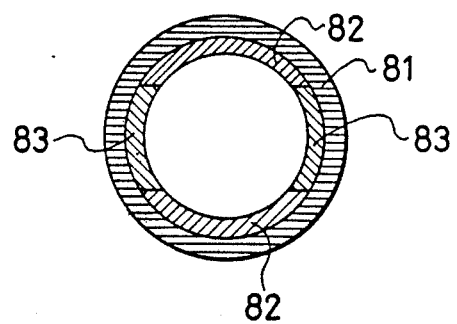
FIG. 8 is a sectional view of the third embodiment.

First, as shown in FIG. 8, a $P_2O_5$—$B_2O_3$ modified $SiO_2$ glass layer 82 is accumulated on the inner surface of the silica tube 81 by the MCVD method using large amount of $P_2O_5$. In this case, the silica tube 81 is not rotated so that the tube 81 is heated in only the vertical direction in FIG. 8 so as to let the glass layer 82 accumulate on the upper and lower inner surface of the tube 81.

Next, after turning the silica tube 81 90 degrees, the $P_2O_5$—$B_2O_3$ modified $SiO_2$ glass layer 83 with a larger amount of $B_2O_3$ than before, is accumulated on the upper and the lower portions of the inner surface of the tube 81 or at an area where nothing is accumulated by that time using the MCVD method while the silica tube 81 is fixed in position during the accumulation process.

Then, the core rod accompanying the cladding (not shown) is inserted into the tube 81, and the tube 81 is collapsed by reducing the pressure so as to form the oval jacket in which the glass layer 83 is positioned in the major axis of the oval and the layer 82 is in the minor axis, and thereby to create the preform of the optical fiber. After examining the refractive index contribution curve of the core, another silica tube is installed or the diameter for drawing, is adjusted so as to obtain an optical fiber which has a desired cut off frequency. By the foregoing method, a polarized wave preserving fiber which has a 0.7% specific refractive index difference between the core 71 and the cladding 72, a −0.2% refractive index between the oval jacket 73 the cladding 72 in the major axis direction, and a +0.2% refractive index between the same two 73 and 72 in the minor axis direction has been manufactured. The cutoff frequencies of the polarized mode of this optical fiber in the major axis (X axis) direction was 1.15 μm and 1.0 m in the minor axis (Y axis), respectively.

Figure 9:
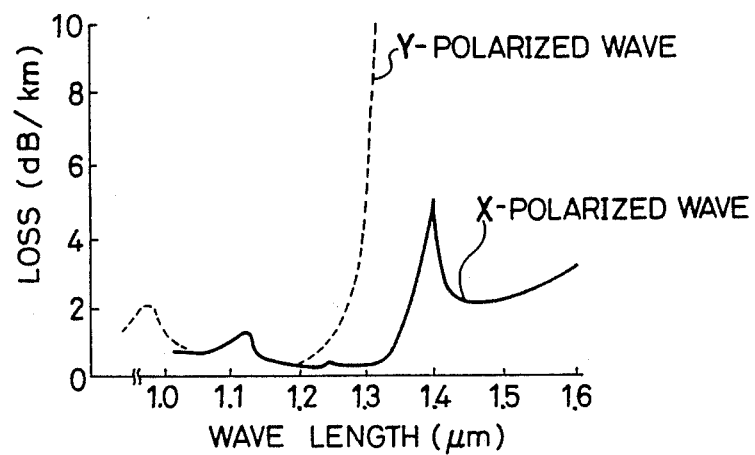
FIG. 9 depicts characteristic curves showing the relationship between the optical loss and the wavelength when the optical fiber of the third embodiment is rolled like a coil spring.

In order to construct the polarized wave-transmitting fiber, the manufactured optical fiber was rolled into a configuration like a coil spring having 30 mm diameter and a 100 m length, and the optical loss was measured. Then, as shown in FIG. 9, a big difference appeared in damping between the two vertically-crossed polarized modes at the wavelength of 1.3 μm, and an extinction ratio of −45 dB was gained. This means that the transmission of only the polarized wave was substantially obtained.

Figure 10:
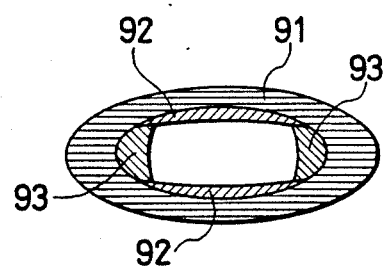
FIG. 10 is a sectional view of an optical fiber which forms another embodiment of the invention.

In the third embodiment, $P_2O_5$—$B_2O_3$ modified $SiO_2$ glass layers 82 and 83 were accumulated on the inner surface of the silica tube 81 which has a round section and during collapsing of the tube 81 the glass layers 82 and 83 are shaped to oval-sectioned ones. However, it is also permissible to allow $P_2O_5$—$B_2O_3$ modified $SiO_2$ glass accumulate on the inner surface of the oval sectioned silica tube 91 as shown in FIG. 10.

In constructing the polarized wave only transmitting fiber, it is also acceptable to coat the outer surface of the fiber with the plastic and then to apply microbending by shrinking the coating, instead of coiling the polarized wave preserving fiber like a coil spring as described above.

As clearly described above, the present invention has the following advantages.

(1) Since a high extinction ration is obtained, the transmission of the single polarized mode is substantially realized.

(2) Since the optical fiber of this invention can be used as a transmission line for coherent communication if relatively a long fiber is used, a remarkable increase is achieved in the transmitting capacity of information.

(3) If a relatively short optical fiber is used, it is easily connected with a normal optical fiber, and a compact and reliable optical fiber polarizer can thus be realized.

What is claimed is:

1. A polarized wave preserving fiber comprising:
a core;
cladding formed around said core;
an oval jacket provided around said core, the retractive index distribution varying along the periphery of said jacket in a manner such that its refractive index is lower than that of said cladding in the minor axis and major axis directions, the difference between the refractive index of said jacket and said cladding in the major axis direction being larger than the difference in the refractive index of said jacket and said cladding in the minor axis direction; and a support member provided around said oval jacket and having the same refractive index as said cladding.

2. The polarized wave preserving fiber of claim 1, wherein said core member is made from Ge modified $SiO_2$ glass, said cladding and support member are made from pure $SiO_2$ glass, and said oval jacket is made from $SiO_2$ glass modified with $P_2O_5$ and $B_2O_3$.

3. The polarized wave preserving fiber of claim 2, wherein the quantity of $B_2O_3$ in said oval jacket in the major axis direction is larger than the quantity of $B_2O_3$ in said oval jacket in the minor axis direction.

4. A polarized wave preserving fiber, comprising:
a core;
cladding formed around said core;
an oval jacket provided around said cladding, the refractive index of the oval jacket varying in its peripheral direction so that the refractive index of the jacket is lower than that of said cladding in the major axis direction and higher than that of said cladding in the minor axis direction; and a support member provided around said oval jacket and having the same refractive index as said cladding.

5. The polarized wave preserving fiber of claim 4, wherein said oval jacket has an ellipticity equal to or more than 10%.

6. The polarized wave preserving fiber of claim 5, wherein said core is made from Ge modified $SiO_2$ glass, said cladding and said support member are made from pure $SiO_2$ glass, and said oval jacket is made from $P_2O_5$ and $B_2O_3$ modified $SiO_2$ glass.

7. The polarized wave preserving fiber of claim 6, wherein said oval jacket contains more $B_2O_3$ in the major axis direction than in the minor axis direction and less $P_2O_5$ in the major axis direction than in the minor axis direction.

* * * * *